United States Patent [19]

Berry

[11] Patent Number: 4,976,348

[45] Date of Patent: Dec. 11, 1990

[54] COASTER BRAKE BICYCLE AND CHANGEABLE SPEED GEAR ATTACHMENT THEREFORE

[76] Inventor: Harry E. Berry, 3510 SW. 32nd Ave., Hollywood, Fla. 33023

[21] Appl. No.: 357,767

[22] Filed: May 26, 1989

[51] Int. Cl.⁵ .............................................. B62M 9/00
[52] U.S. Cl. .................... 192/6 A; 74/417; 280/238; 474/84
[58] Field of Search ................ 74/417; 192/6 A; 280/238; 474/84, 88

[56] References Cited

U.S. PATENT DOCUMENTS

| | | | |
|---|---|---|---|
| 446,354 | 2/1891 | Kane | 74/417 X |
| 528,956 | 11/1894 | Lippy et al. | 280/238 |
| 628,453 | 7/1899 | Delane | 280/238 |
| 1,736,680 | 11/1929 | Toliver | 74/342 |
| 2,171,886 | 9/1939 | Musselman | 192/6 A |
| 3,782,210 | 1/1974 | Holleman | 74/415 X |
| 3,831,978 | 8/1974 | Dunder et al. | 280/238 |
| 3,863,503 | 2/1975 | Loeb et al. | 74/347 |
| 4,005,611 | 2/1977 | Jeffries | 74/416 |
| 4,813,302 | 3/1989 | Davidow | 280/238 X |

FOREIGN PATENT DOCUMENTS

| | | | |
|---|---|---|---|
| 754040 | 10/1933 | France | 280/238 |
| 427107 | 11/1947 | Italy | 280/238 |
| 9394 | 12/1894 | Switzerland | 280/238 |

*Primary Examiner*—Rodney H. Bonck
*Attorney, Agent, or Firm*—Mason, Fenwick & Lawrence

[57] ABSTRACT

A changeable speed gear attachment for bicycles. including the first gear for interconnection with the front sprocket of a standard bicycle, and a second gear for interconnection with the rear sprocket of a standard bicycle, is disclosed. Shifting means, comprising a plurality of gears and an associated shift lever and transmission cable, are further disclosed. The device may be mounted on the rear frame members of the bicycle without modification of the frame, and the device may be used with bicycles having either a standard chain transmission or a direct-drive chainless transmission.

10 Claims, 2 Drawing Sheets

COASTER BRAKE BICYCLE AND CHANGEABLE SPEED GEAR ATTACHMENT THEREFORE

BACKGROUND OF THE INVENTION

The present invention generally relates to bicycles, especially standard bicycles having no shiftable gears, and which are provided with coaster brakes. The present invention specifically relates to add-on changeable speed gearing devices for attachment to unmodified standard bicycles.

FIELD OF THE INVENTION

The basic design of standard bicycles has not changed significantly over several decades. Typically, a standard bicycle is provided with a single sprocket for transmitting chain power from the cranks to the rear wheel. Although this configuration is mechanically simple and easy for the operator to control, it possesses the significant disadvantage that traveling over hilly, uneven terrain is very difficult. Specifically, the rider cannot shift to a lower gear ratio to promote easier travel over hills.

However standard bicycles having a single gear ratio retain a significant advantage. Such bicycles are generally provided with "coaster" brakes, operated by a reverse pedal movement so as to move the cranks in reverse, thereby engaging the brakes easily and under the close control of the rider. In contrast, bicycles having multiple shiftable gear ratios typically are provided with caliper brakes, which comprise brake shoes mounted on the rim of the bicycle wheel and movable levers for engaging the brake shoes. If only the front brake is applied at high speed such caliper brake systems present a significant risk of injury to the rider as a consequence of throwing the rider from the bicycle.

Many inventors have attempted to overcome the disadvantages of non-geared standard bicycles, while retaining the advantage of a coaster brake. For example, U.S. Pat. No. 1,736,680 (Toliver) discloses a relatively wide, bulky and heavy changeable speed transmission gear attachment for bicycles which mounts internally within the frame of a standard bicycle. The attachment replaces the standard sprocket with a new sprocket integral to the transmission device, and the apparatus includes a shifting lever protruding from the top of the apparatus. However, the Toliver device requires that the pedals be positioned widely apart so as to render pedaling difficult and cumbersome. Moreover, the device of Toliver would necessarily require a longer chain than a conventional bicycle chain so as to render conversion of a conventional bicycle to usage of the Toliver system an expensive endeavor.

U.S. Pat. No. 3,782,210 (Holleman) shows a changeable speed gear box which may be attached to standard bicycles by securing it to the lower rear portion of the frame. The device is drivingly linked to the rear bicycle wheel by a short drive chain, and retains use of the front sprocket and standard chain (with links removed for shortening). A gear shift lever is joined to the device using a flexible cable 76. The standard "coaster" brake provided on the bicycle may continue to be used after attachment of the Holleman device.

The Holleman device is attached to the bicycle frame using a single attachment member 26, which is bolted to the frame member 20 and causes the device to hang below the frame near the wheel. This configuration presents a significant risk that the device may work loose due to accumulated stress built up through vibration of the device and the arm securing it to the frame. Further, when the device is interconnected with the standard bicycle chain, the apparatus effectively forces the chain to run along a plane significantly lower than that of the standard chain configuration. This lower disposal of the chain increases the risk that the chain may become fouled with the rider's clothing.

Finally, the invention disclosed by Holleman cannot easily be interconnected with bicycles having direct-drive, chainless transmission systems.

A chainless transmission system was conceived by Kane in 1891, as described in U.S. Pat. No. 446,354. That disclosure provides a bicycle transmission having a pair of bevel gears secured to either end of a rigid rod, which transmits drive force from the cranks to the rear wheel. Improvements in this system are reflected in U.S. Pat. Nos. 609,344 (Harridy), 620,929 (Jocelyn), 622,780 (Olsen et al), 628,453 (Delane), and others. Later inventors developed methods of coupling changeable speed devices to a direct-drive, chainless bicycle transmission. Specifically, U.S. Pat. Nos. 3,863,503 (Loeb et al) and 4,005,611 (Jeffries) disclose such mechanisms.

However, no prior patents disclose the combined use of an add-on changeable speed gearing device for standard bicycles having direct drive chainless transmissions.

SUMMARY OF THE PRESENT INVENTION

Accordingly, it is one object of the present invention to provide a changeable speed gear attachment for bicycles which is free of the aforementioned and other disadvantages.

It is a further object of the present invention to provide a changeable speed gear attachment for bicycles which may be easily mounted on a standard bicycle having either a chain-drive or a chainless transmission, without need for major modification of the bicycle.

It is another object of the present invention to provide a changeable speed gear attachment for bicycles which is easy and efficient to use.

Accordingly, to implement these and other objects of the present invention, which will become more readily apparent from the description below, a changeable speed gear attachment is provided which attaches to the lower rear portion of a standard bicycle frame using a plurality of fasteners, promoting stability and rigidity of the attached device. The device may be interconnected with either a standard, chain bicycle transmission or a chainless, direct-drive transmission. The multiple-speed gearing within the invention may be selectively controlled by the rider using a gear change lever coupled to the device using a suitable cable or other means. Within the housing of the invention are a plurality of gears and a shift mechanism of conventional design.

DETAILED DESCRIPTION OF THE PREFERRED EMBODIMENTS

Figure 1:
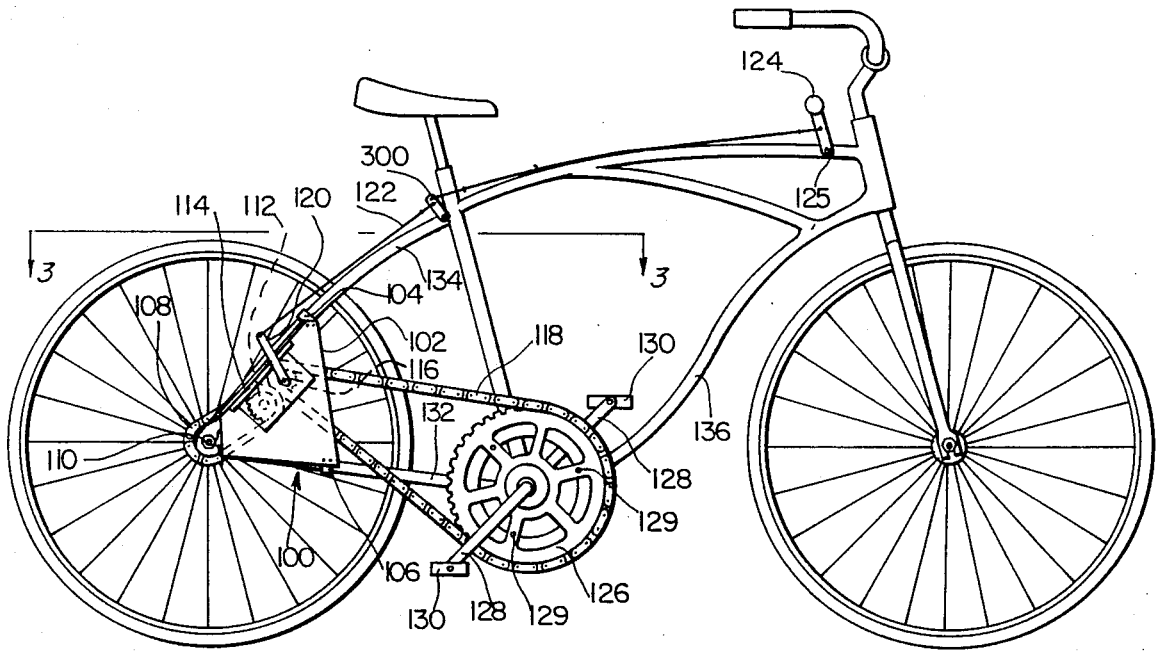
FIG. 1 is a side elevation of a standard bicycle having chain transmission and incorporating the present invention.

In describing the preferred embodiments of the subject invention illustrated in the drawings, specific terminology will be used for the sake of clarity. However, the invention is not intended to be limited to the specific terms so selected, and each specific term includes all technical equivalents which operate in a similar manner to accomplish a similar purpose.

Referring generally to the preferred embodiment illustrated in FIGS. 1–4, and referring specifically to FIG. 1, an add-on variable speed power transmission means 100 is provided for mounting on standard bicycles having a chain transmission. The transmission means 100 includes a housing 102 for covering and shielding the internal components of the device 100 from human contact, dirt, and other contamination. The housing 102 is secured to the bicycle frame using two attachments 104 and 106. The attachments 104 and 106 comprise a flexible pipe clamp and associated bolt of conventional design. The attachment 104 is secured to the rear control upper frame member component 134 of the bicycle, and the attachment 106 is secured to the bottom horizontal frame member component 132 of the bicycle. Frame components 132 and 134 intersect at an apex in which the rear wheel of the bicycle is mounted.

A small chain 108 is provided and interconnects the device 100 with the rear sprocket (not shown) of the bicycle. The rear sprocket, which is hidden from view in FIG. 1, rotates about axle 110 of the bicycle.

The device 100 can use any of many conventional multispeed transmission designs such as that of Toliver, for example, further includes an internal gear cluster of conventional construction (not shown), which cluster includes at least one transmission gear 112 and a rotating shaft 114. The device 100 includes a plurality of different gears (not shown), all of which rotate about shaft 114 on concentric axes. The gears have different gear ratios and are interconnected within the device 100 using a shift mechanism (not shown) of conventional design. A single gear 112 and the shaft 114 are shown in the drawings to illustrate the interconnection of chain 108 and chain 118, but not to limit the invention to use of only a single gear 112.

The device 100 further includes a gear 116 rotating about shaft 117, which gear 116 interconnects with the large chain 118 of the standard bicycle. The gear 116 cooperates with and is shifted to mesh with the gear 112 and other changeable speed gears within the device 100 using lever 120, which transmits shifting tension along cable 122 from the shift lever 124. Lever 124 is secured to the bicycle using a fastener 125 of conventional design, such as a bolt.

The large standard bicycle chain 118 cooperates with a sprocket 126 which is attached on top of, and which replaces, the standard bicycle sprocket 127. Thus, modification of the bicycle to attach the subject invention requires securing the subject invention to the rear portion of the frame, and securing the new sprocket 126 adjacent to and on top of the standard pedal crank mounted bicycle sprocket 127 using a plurality of conventional fasteners 129.

Figure 3:
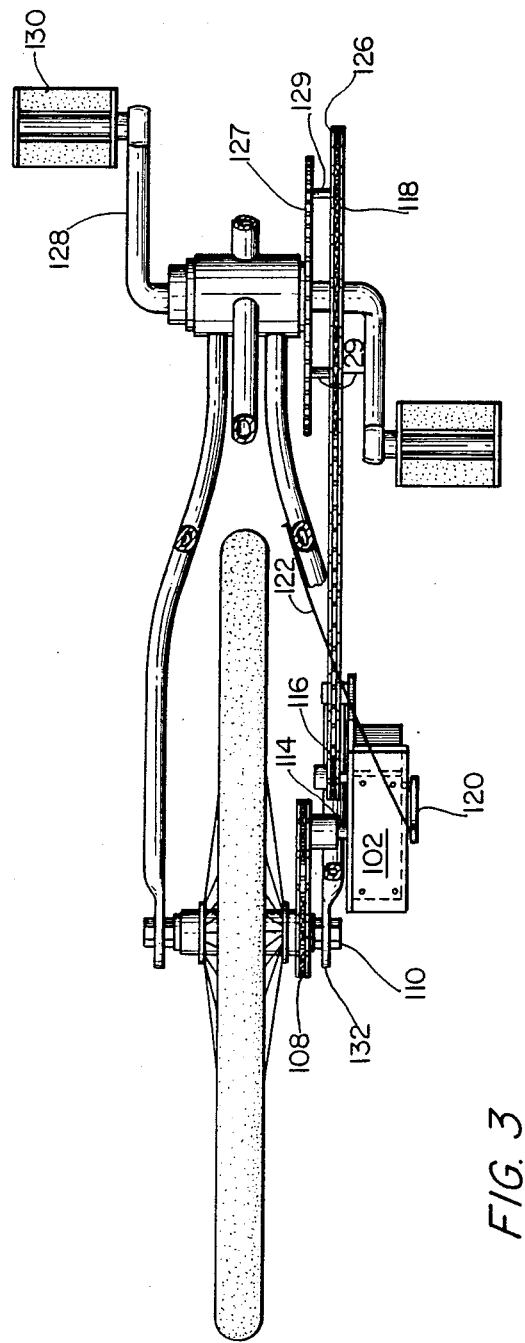
FIG. 3 is a section view along line 3—3 of the bicycle of FIG. 1 showing the attachment and interconnection of the present invention.

The arrangement of the sprocket 126 and the standard bicycle sprocket 127 may be fully appreciated by referring to FIG. 3, which shows the new sprocket 126 and the standard sprocket 127 mounted such that they rotate about the same axis.

In operation, drive force is transmitted by the feet of the rider to the pedals 130, cranks 128, and the sprocket 126. The sprocket 126 cooperates with and transmit drive force through the large chain 118. Gear 116 cooperates with chain 118 and receives drive force. The drive force is then transmitted to other gears, such as gear 112, which meshes gear 116. Gear 112 cooperates with chain 108 to transmit drive force to the rear wheel of the bicycle. The ratio of the gears 116 and 112 may be changed by shifting the device 100 during operation, using shift lever 124 and cable 122. When braking is desired, the rider rotates the pedals 130 and the sprocket 126 counterclockwise, transmitting drive force in reverse to the coaster brake mounted within the rear hub of the bicycles.

Figure 2:
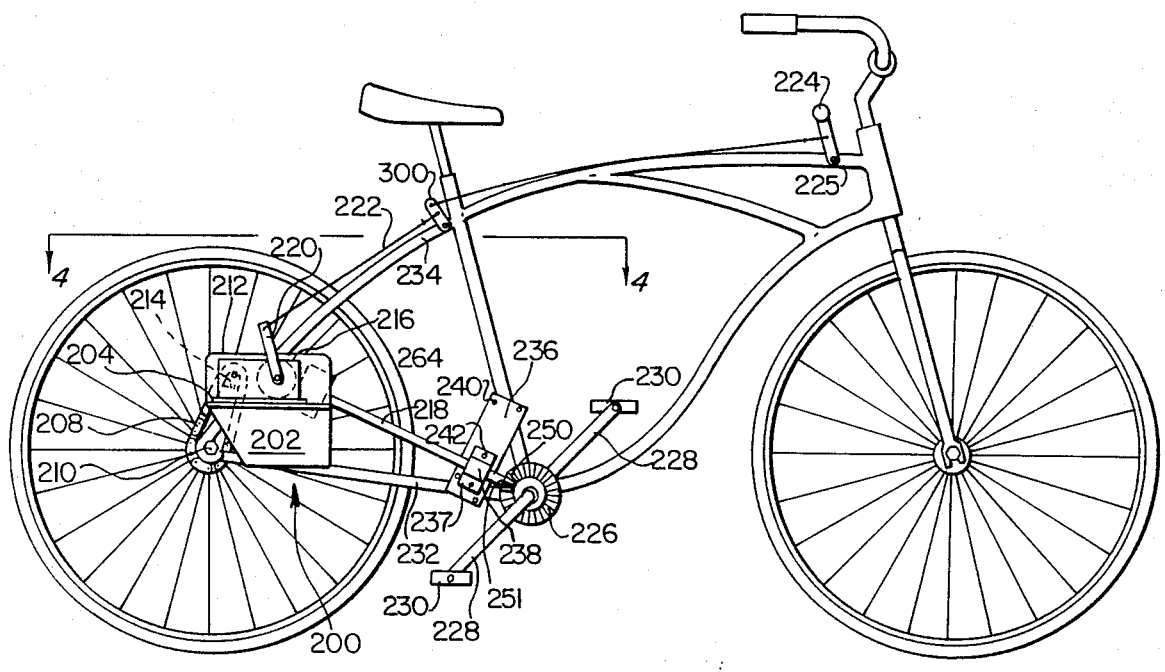
FIG. 2 is a side elevation of a standard bicycle having a direct-drive chainless transmission and incorporating the present invention.

Referring now to FIG. 2, a device 200 according to the present invention is shown secured to a bicycle having a direct-drive, chainless transmission.

The device 200 includes a housing 202 for shielding the internal components of the invention which can be any one of many conventional multi-sized gear transmissions such as, for example, the transmission of Toliver.

The device 200 further includes a small transmission chain 208 which rotates about axle 210 and cooperates with the rear sprocket of the standard bicycle. The small chain 208 also cooperates with an output gear 214 which gear 214 rotates about axle 212, and which gear 214 and axle 212 are contained within the housing 202 of device 200. At least one gear 216 is contained within the housing 202, which gear 216 cooperates with a drive shaft 218.

Shifting the device 200 is accomplished by lever 224, which transmits shifting force through cable 222. The lever 224 is attached to the bicycle, using a fastener 225 of conventional design. The cable 222 is secured to shift lever 220, which conveys shifting force to a conventional shift mechanism (not shown) within housing 202.

As further indicated in FIG. 2, the direct-drive transmission system of the standard bicycle includes a transmission drive shaft 218 which terminates at its forward end 250 on which a power output bevel gear 251 is mounted. The bevel gear 251 cooperates with gear 226, which is attached to the hub of the bicycle. Conventional cranks 228 and pedals 230 transmit drive force from the rider to the bevel gear 226. The shaft 218 is mounted on base plate 236 using a plurality of conventional fasteners 240 to secure plate 236 to frame member 232 and frame member 237 of the bicycle. Specifically, one end of the plate 236 is secured to the seat post frame member 237 of the bicycle, and the other end of the plate 236 is secured to the bottom frame member 232 of the bicycle. A retainer plate 238 retains the shaft 218 in place, which plate 238 is attached to spacer plate 237 and plate 236 using a plurality of conventional fasteners 242.

Figure 4:
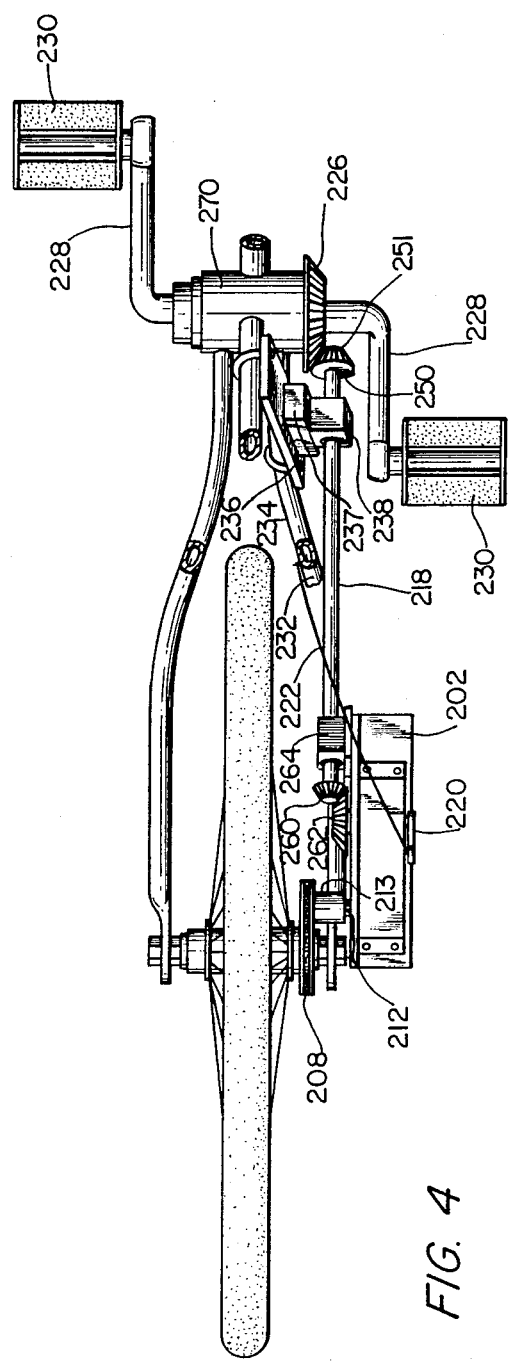
FIG. 4 is a section view of the bicycle along line 4—4 of FIG. 2 showing the attachment and interconnection of the present invention.

A more complete appreciation of the arrangement of these components may be derived by referring to FIG. 4, which is a section view of the components of the direct-drive transmission illustrating the manner in which they connect to the subject invention. Specifically, gear 226 is mounted adjacent to hub housing 270, such that the gear 226 operates in place of the sprocket commonly used on standard bicycles. FIG. 4 also depicts the stacked arrangement of retainer plate 238, spacer plate 237, and mounting plate 236. As further depicted in FIG. 4, the shaft 218 intersects, and rotates within, a second retainer block 264, which block 264 is secured to the housing 202 of the device 200.

The shaft 218 further terminates in a bevel gear 260, which gear cooperates with and meshes with bevel gear 262, thereby supplying drive force to the subject invention.

Drive force is transmitted to the standard bicycle through shaft 212, housing 213, and small chain 208, all depicted in FIG. 4.

Installing a device according to the present invention requires securing the device to the rear frame members of the bicycle, as shown in the drawings. The chain 208 is then interconnected with the standard rear sprocket of the bicycle. Then the gear shift lever is secured to an upper frame member of the bicycle.

If the device is to be installed on a chain-drive bicycle, a new sprocket is attached on top of, and parallel to, the standard bicycle sprocket. Next, the standard bicycle chain is threaded around the new sprocket and is interconnected with the device.

In operation, drive force is transmitted by the feet of the rider to the pedals 230 and the gear sprocket 226. The gear 226 cooperates with and transmit drive force through the rod 218. Gear 260 cooperates with gear 262 which gear 262 receives drive force. The drive force is then transmitted to other gears, such as gear 212, which meshes gear 216 within housing 202. Gear 212 cooperates with chain 208 to transmit drive force to the rear wheel of the bicycle. The ratio of the gears 216 and 212 may be changed by shifting the device 200 during operation, using shift lever 224 and cable 222. When breaking is desired, the rider rotates the pedals 230 counter-clockwise, transmitting drive force in reverse to the coaster brake mounted within the rear hub of the bicycles.

In both embodiments illustrated in FIGS. 1 and 2, a transmission hanger 300 is provided and is secured to the upper frame member of the bicycle.

Many modifications and variations of the present invention are possible in light of the above teachings and specification. Therefore, within the scope of the appended claims, the invention may be practiced otherwise than as specifically described.

I claim:

1. In a bicycle having a standard coaster brake and chain transmission the improvement comprising:
    a changeable speed transmission attachment mounted in housing means for protecting and housing said attachment;
    said housing means being mounted between upper and lower frame members having an apex at which the rear wheel of the bicycle is mounted;
    first gear means in said changeable speed transmission for interconnection with the transmission of a standard bicycle;
    second gear means in said changeable speed transmission for interconnection with the rear sprocket of a standard bicycle;
    chain means for interconnecting said second gear means and said rear sprocket;
    transmission shift means, for shifting said changeable speed transmission from one speed to another; and
    said attachment permitting use of said coaster brakes;
    said transmission shift means comprising:
    a gear shift lever, said lever being pivotally secured to a upper frame member of said bicycle;
    a transmission hanger, said hanger being pivotally secured to an upper frame member of said bicycle such that said hanger is located midway between said lever and said housing means;
    a force transmission lever pivotally mounted on said housing means, said force transmission lever cooperating with a gear change mechanism housed within said housing means;
    a transmission cable having first and second ends, said first end being secured to an upper portion of said shift lever; and
    said second end being secured to said transmission lever.

2. The device of claim 1, said second gear means comprising a gear mounted on an axle, said axle being rotatably mounted within said housing means.

3. The device of claim 2, said chain means comprising a chain adapted to cooperate with, and to interconnect, said second gear means and said rear sprocket.

4. A changeable speed attachment for standard bicycles having a power transmission means for transmitting power from pedals to the rear wheel of the bicycle, said attachment comprising:
    housing means for protecting and shielding internal components of said attachment, said housing means being mounted between upper and lower frame members having an apex at which the rear wheel of the bicycle is mounted;
    first gear means for interconnection with the power transmission of a bicycle;
    second gear means for interconnection with the rear sprocket of a standard bicycle;
    chain means for interconnecting said second gear means and said rear sprocket;
    a plurality of changeable speed gears, housed within said housing means, for providing different, changeable gear ratios for interconnection of said first gear means and second gear means; and
    gear shift means, for shifting said plurality of gears;
    wherein said gear shift means includes:
    a gear shift lever, said lever being capable of being pivotally secured to a upper frame member of said bicycle; and said attachment further includes:
    a transmission hanger, said hanger being pivotally secured to an upper frame member of said bicycle midway between said lever and said housing means;
    a force transmission lever pivotally mounted on said housing means, said lever cooperating with a gear change mechanism housed within said housing means;
    a shift cable having first and second ends, said first end being secured to said shift lever; and
    said second end being secured to said transmission lever.

5. The device of claim 4, said first gear means comprising a bevel gear capable of interconnection with a direct-drive, chainless bicycle transmission, wherein said transmission includes a single direct-drive shaft, and wherein said housing means is secured outboard of said frame member.

6. The device of claim 5, said second gear means comprising a gear mounted on an axle, said axle being rotatably mounted within said housing means.

7. The device of claim 6, said chain means comprising a chain adapted to cooperate with, and to interconnect, said second gear means and the rear sprocket of a bicycle on which the device is mounted.

8. In a bicycle of the type having a frame, pedal driven power output means on said frame and a rear wheel mounted on said frame near the apex juncture of a lower horizontal frame component and an upper canted frame component, the improvement comprising;
  variable speed power transmission means mounted on said upper canted frame component and said lower horizontal frame component and including a transmission power input means and a transmission power output means;
  power transfer means for transferring power from said pedal driven power output means to said transmission power input means; and
  wheel drive means for driving the rear wheel in response to rotation of said transmission power output means;
  wherein said power transfer means includes a drive chain mounted between an output sprocket of said pedal driven power output means and said transmission power input means;
  wherein said output sprocket is coaxially mounted on a standard bicycle front sprocket.

9. In a bicycle of the type having a frame, pedal driven power output means on said frame and a rear wheel mounted on said frame near the apex juncture of a lower horizontal frame component and an upper canted frame component, the improvement comprising:
  variable speed power transmission means mounted on said upper frame component and said lower horizontal frame component and including a transmission power input means and a transmission power output means;
  power transfer means for transferring power from said pedal driven power output means to said transmission power input means; and
  wheel drive means for driving the rear wheel in response to rotation of said transmission power output means;
  wherein said wheel drive means comprises a chain drivingly connected between said transmission power output means and a sprocket on said rear wheel;
  wherein said power transfer means includes a drive chain mounted between an output sprocket of said pedal driven power output means and said transmission power input means;
  wherein said output sprocket is coaxially mounted on a standard bicycle sprocket attached to a pedal crank of said bicycle.

10. In a bicycle of the type having a frame, pedal driven power output means on said frame and a rear wheel mounted on said frame near the apex juncture of a lower horizontal frame component and an upper canted frame component, the improvement comprising:
  variable speed power transmission means mounted on said upper frame component and said lower horizontal frame component and including a transmission power input means and a transmission power output means;
  power transfer means for transferring power from said pedal driven power output means to said transmission power input means; and
  wheel drive means for driving the rear wheel in response to rotation of said transmission power output means;
  wherein said power transfer means includes a drive shaft having a forward end on which a power output bevel gear is mounted, said power output bevel gear being driven by a bevel gear driven by a crank of said bicycle and wherein said transmission power input means comprises a bevel gear drivingly engaged with a bevel gear mounted on the rear end of said drive shaft;
  wherein said wheel drive means comprises a chain drivingly connected between said transmission power output means and a sprocket on said rear wheel.

* * * * *